E. F. MARTIN.
AUTOMOBILE ATTACHMENT.
APPLICATION FILED APR. 21, 1914.
1,102,773.
Patented July 7, 1914.
3 SHEETS—SHEET 2.
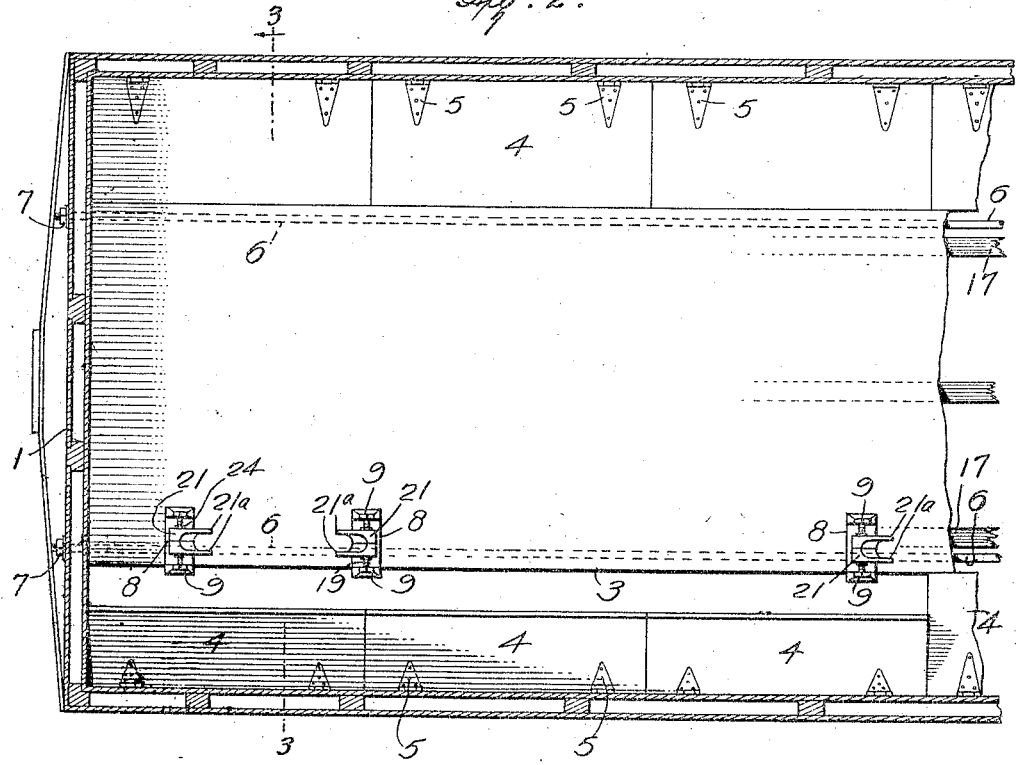
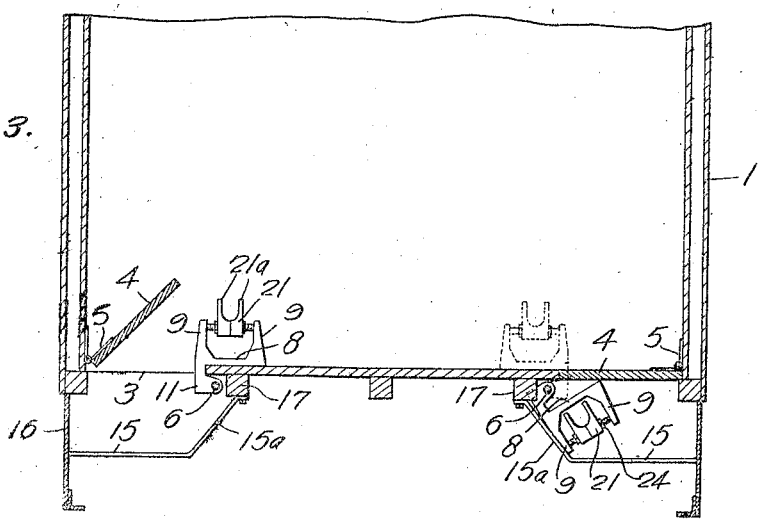
WITNESSES
INVENTOR
EMILE F. MARTIN,
BY
ATTORNEYS

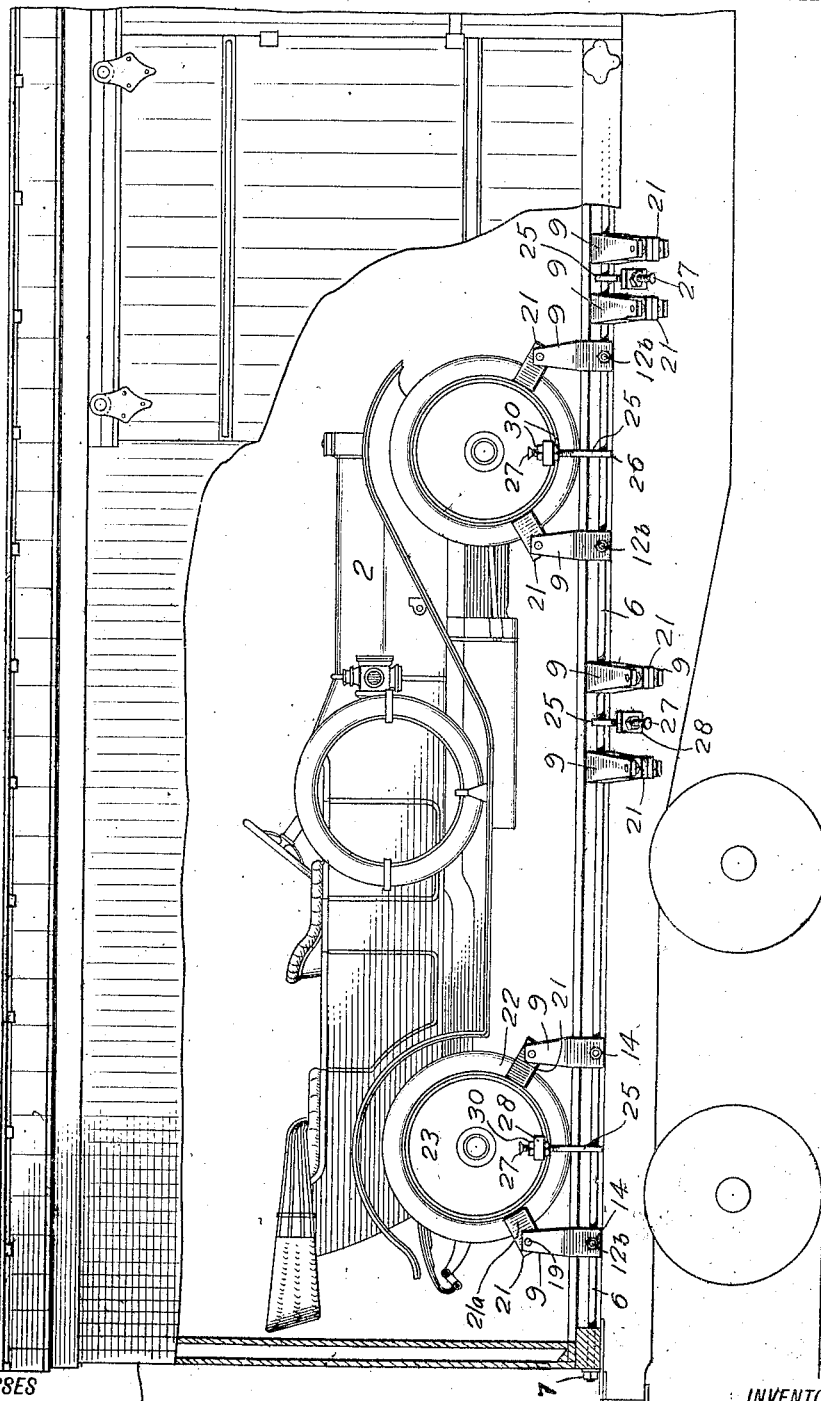

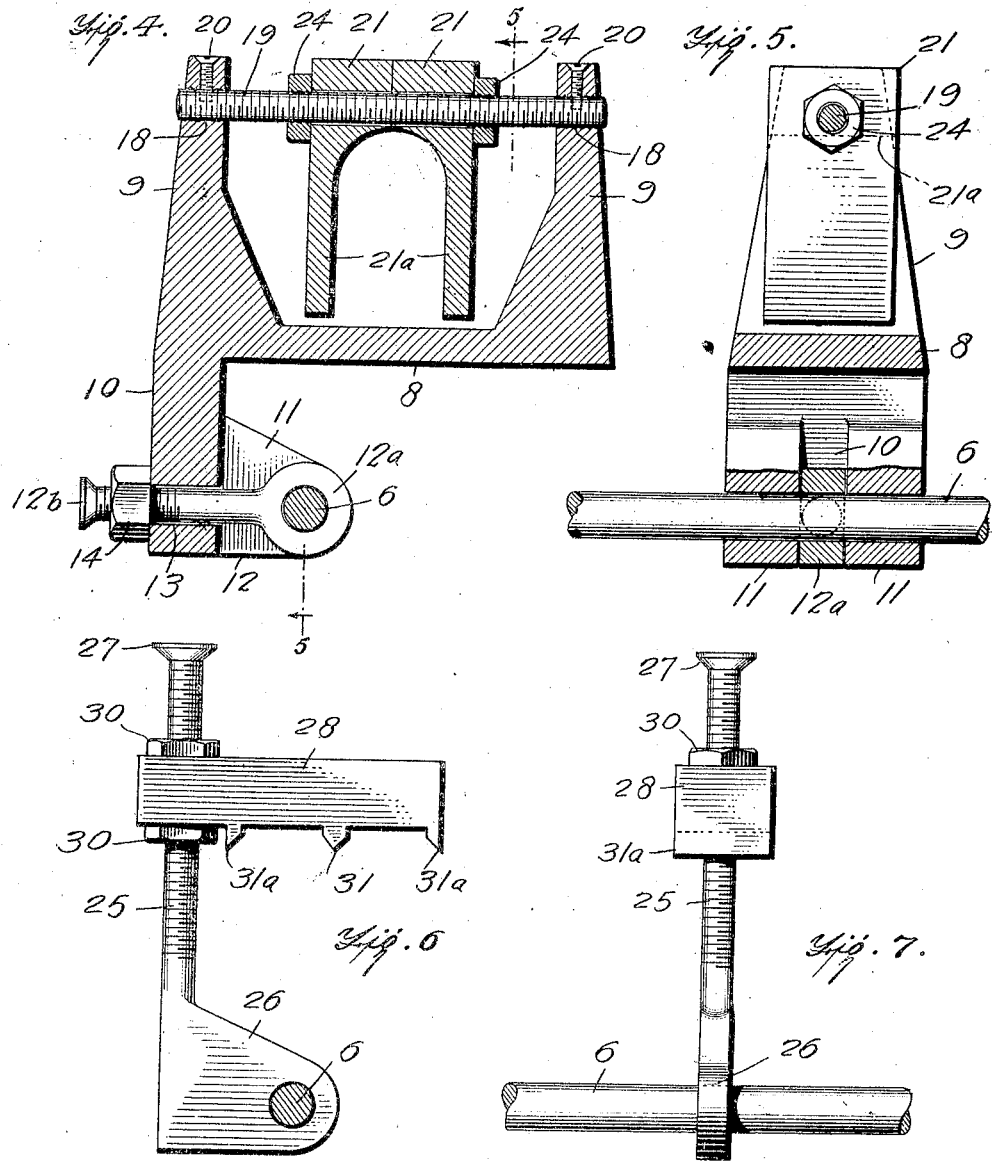

UNITED STATES PATENT OFFICE.

EMILE FREDERICK MARTIN, OF NEW ORLEANS, LOUISIANA.

AUTOMOBILE ATTACHMENT.

1,102,773.  Specification of Letters Patent.  Patented July 7, 1914.

Application filed April 21, 1914. Serial No. 833,431.

*To all whom it may concern:*

Be it known that I, EMILE F. MARTIN, a citizen of the United States, and a resident of New Orleans, in the parish of Orleans and State of Louisiana, have made certain new and useful Improvements in Automobile Attachments, of which the following is a specification.

My invention is an improvement in automobile attachments, for freight cars, and has for its object to provide mechanism in connection with a railroad freight car for supporting automobiles during shipments in such manner that the automobile is prevented from movement either longitudinally or laterally with respect to the car and is firmly clamped to the car, without, however, any undue wear on the tires of the car, and wherein the mechanism is so arranged that it may be moved into operative position, or moved out of operative position and beneath the level of the floor of the car, to prevent interference with other freight when the car is used for other purposes.

In the drawings: Figure 1 is a side view of a railroad freight car provided with the improved attachment with the automobile in place, a part of the car being in section, Fig. 2 is a horizontal section of a portion of the car, Fig. 3 is a section on the line 3—3 of Fig. 2 looking in the direction of the arrows, Fig. 4 is an enlarged vertical section of one of the supports, Fig. 5 is a section on the line 5—5 of Fig. 4, looking in the direction of the arrows, Fig. 6 is a side view of one of the clamping devices for clamping the wheels to the floor, Fig. 7 is a front view of the same, and Fig. 8 is a bottom plan view of the engaging member of the clamping mechanisms.

The present embodiment of the invention is shown in connection with a railroad freight car 1 of usual construction, as far as the general structure of the car is concerned. The automobile 2 to be supported is arranged within the car, and the attachment consists of a clamping device for each wheel, and a plurality of supports for each wheel.

The car 1 is provided at each side of the floor with a longitudinally extending opening 3, each of which is normally closed by a series of doors 4, each door being hinged at 5 to the adjacent side of the car, in such manner that it may be swung upwardly against the inner face of the side of the car, or downwardly into the plane of the floor of the car.

The doors of each series are in alinement, as shown more especially in Fig. 2, and when the doors are closed into the plane of the car, the car does not differ from the ordinary freight car, and may be used for freight other than automobiles. A shaft or rod 6 is supported longitudinally of the car at the inner side of each of the passages or openings 3, each of the said shafts or rods having its ends threaded, and passed through the adjacent ends of the car, and engaged by nuts 7, to hold the rods in fixed position with respect to the car.

The supporting and clamping mechanisms for the several wheels of the automobile are connected with the rod, in such manner that they may be swung into operative position on the floor of the car at the inner sides of the openings 3, or below the level of the floor of the car, to permit the closing of the doors 4. Each of the supporting mechanisms for the wheels comprises a substantially U-shaped support consisting of a body 8 and arms 9 extending upwardly from the body approximately parallel with each other, and the body is provided with a depending lug 10 at the outer side thereof, and each of the lugs 10 is provided with a pair of laterally extending spaced bearing arms 11, the arms extending below the body of the support, as shown in Fig. 4.

The bearing arms 11 of each support 8—9 are journaled on the adjacent rod 6, and an eye-bolt 12 is arranged between the bearing arms, the eye 12$^a$ of the bolt engaging the rod 6, while the bolt proper passes through an opening 13 in the lug 10, and is engaged by a nut 14 at the outer side of the lug 10. Each of the eye-bolts is provided with a head 12$^b$ at the end remote from the eye, for limiting the outward movement of the nut 14. It will be evident that when the support 8—9 is in the position of Fig. 4, that is with the body 8 of the support horizontal, the support may be fixed in this position, by tightening the nut 14. The support is thus clamped on the adjacent rod or shaft 6. By loosening the nut 14, the support may be swung through the adjacent opening 2, into a position such that the body 8 of the support rests upon the bottom of the car, or into such position that the support is below the level of the body of the car, and brackets each consisting of portions 15 and 15ª arranged at an obtuse angle with respect to each other are provided below the car for supporting the supports.

The arm 15 of the brackets 15—15ª is rigidly connected with the frame 16 of the car, while the arm 15ª is connected with a longitudinally extending bar 17 on the under face of the car. When the supports are in inoperative position, the outermost arm 9 rests against the portion 15ª of the adjacent bracket arms, and is held in this position, until it is desired to again use the supports. The supports are also movable longitudinally of the car, in order to provide for vehicles having different wheel bases, it being only necessary to loosen the nut 14 to permit this longitudinal adjustment. It will be obvious that when the nut is tightened the support is held from further longitudinal movement.

Each of the arms 9 of each support 8—9 is provided with a threaded opening 18, the openings being in alinement, and a threaded rod 19 is engaged with the openings of the arms, each of the rods 19 extending parallel with the body 8 of the support. Set screws 20 are passed through the upper ends of the arms, and into openings in the threaded rod, to lock the said rods in place in the supports. A substantially U-shaped gripping member, consisting of similar sections is supported by each rod. Each of the said gripping members consists of similar sections, each section comprising a hub 21 journaled on the rod, and an arm 21ª extending radially from the hub. The arms 21ª are at the outer ends of the hubs, so that when the inner ends of the hubs are abutted, the arms will be spaced apart, to receive the tire 22 of the adjacent wheel 23 between the said arms.

A lock nut 24 is threaded on to each rod at the outer side of the adjacent section of the gripping member, and it will be evident that by turning the nuts 24 in the proper direction, the hubs may be clamped tightly together, while by loosening the nuts the sections of the gripping member may be separated. Two of the supports are provided for each wheel, and the under face of the body 8 of each support rests upon the bottom of the car when the said supports are in operative position, as shown at the left of Fig. 3. The arms 21ª of the sections of the gripping members engage opposite faces of the tire of the adjacent wheel, with the peripheral surface of the tire resting against the hubs, and it will be noted from an inspection of Fig. 4 that the inner faces of the arms at their junction with the hubs are rounded to fit the tire.

The arms 21ª extend to the rim of the wheel, and the said arms of each support are inclined inwardly and upwardly, as shown in Fig. 1. As before stated, two supports are provided for each wheel, one support being arranged in front of the wheel and the other in rear of the wheel, and the arms 21ª of the gripping members incline upwardly toward the hub of the adjacent wheel. A clamping member is also provided for each wheel, each of the said members comprising a threaded rod 25 having at one end a laterally extending bearing arm 26 which is journaled on the adjacent shaft or rod 6, and having at the other end a head 27.

A clamping jaw in the form of a bar 28 is mounted on the rod, the bar having an opening 29 at one end, through which the threaded rod 25 extends. The opening 29 is of sufficient diameter to permit free movement of the bar 28 with respect to the rod, and lock nuts 30 are arranged on the rod above and below the bar, for fixing the bar in adjusted position. It will be evident that by turning the nuts in the proper direction the bar may move upwardly or downwardly. Each of the bars 28 is provided with a series of depending lugs, namely a central lug 31 and lateral lugs 31ª. One of the lugs 31ª is at the outer end of the bar, while the other lug 31ª is near the opening 29. The lug 31 is half way between the lugs 31ª, and the lower ends of the said lugs are beveled in opposite directions, that is the lower ends of the lugs 31ª are beveled downwardly and outwardly away from the central lug.

A clamping member consisting of the rod 25 and the bar 28 is arranged between each pair of supports, and the said clamping members are arranged to swing through the opening 3 of the car and into and out of operative position with the supports.

In use the bar 28 is adjusted vertically with respect to the adjacent rod, until the bar 28 may be swung in between the spokes of the adjacent wheel. The nuts 30 are then turned in a direction to permit the bar to move downwardly, until the lug 31 and one of the lugs 31ª of the bar engage over opposite sides of the wheel. When this is done, the wheel is clamped firmly to the floor of the car, while at the same time the supports prevent any wear on the tire, due to oscillating movement of the car.

In practice, an ordinary automobile car will be provided with thirty-two supports, sixteen individual supports, or eight pair on each side of the car, and there will be sixteen clamping members, one for each pair of supports. With sixteen pairs of supports, cars may be carried in such manner that there is no possibility of damage to the car or to its tires. The supports and clamping members not in use may be swung down below the level of the floor of the car, so that the remainder of the car may be used for other classes of freight. The doors 4 are made sectional in order that any portion of the passage 3 at either side not used may be closed over the supports and clamping members below the floor.

Since the supports and the clamping members are adjustable longitudinally of the car, they may be moved to fit any make or size of car, and when not in use and in position below the floor of the car, the car is fitted for any other class of freight. But little change is required in the car itself, merely the formation of the openings 3 and the addition of the doors 4, together with the supporting brackets 15—15ª.

By means of the eye-bolts and the nuts 14 the individual supports may be clamped rigidly to the shaft or rod 6 at the desired position with respect to the car. In use, the supports and the clamping members are swung into operative position after the car has been loaded, and they are then moved to position adjacent to the wheel. The bar 28 of each clamping member is swung over the wheel, and clamped in the manner above-mentioned. The supports are then engaged with the wheels, and clamped in fixed position with respect to the wheels. The car is then ready for travel. When the car is used for other purposes than hauling automobiles the supports and the clamping members are swung down into position on the brackets 15—15ª and the doors 4 are closed.

I claim:—

1. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of a car at the inner side of the adjacent opening, or to a position below the level of the floor, said supports being arranged in pairs and the members of each pair being adapted to engage a wheel in front and in rear thereof, a clamping member mounted on the rod between each pair of supports and arranged to swing through the adjacent openings, the car having means for supporting the supports and the clamping members below the floor, each of the said supports comprising a substantially U-shaped member consisting of a body adapted to rest upon the floor of the car when in operative position, and arms extending upwardly from the ends of the body, a threaded rod supported longitudinally of the body at the upper ends of the arms and detachably connected with the arms, a substantially U-shaped gripping member arranged on each rod, each of the said gripping members being sectional and comprising a hub journaled on the rod, and an arm extending radially from the outer end of the hub, said arms coöperating to grasp opposite faces of the tire, lock nuts on the rod at the outer side of each section, the body having at its outer end a depending lug, and each lug having a pair of inwardly extending bearing arms journaled on the adjacent rod, said arms being spaced apart longitudinally of the rod, an eye-bolt engaging the rod between the arms, the lug having an opening through which the eye-bolt extends, said bolt having a head at the opposite side of the lug from the rod, a nut threaded on to the rod for clamping the support to the rod, each of the clamping devices comprising a threaded rod having at one end a head, and having at the other a laterally extending bearing arm journaled on the adjacent rod, a bar provided at one end with an opening through which the rod extends, and having on its under face depending lugs for engaging opposite sides of the wheel, said bar being shaped to extend between adjacent spokes, and lock nuts above and below the bar.

2. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of a car at the inner side of the adjacent opening, or to a position below the level of the floor, said supports being arranged in pairs and the members of each pair being adapted to engage a wheel in front and in rear thereof, a clamping member mounted on the rod between each pair of supports and arranged to swing through the adjacent opening, the car having means for supporting the supports and the clamping members below the floor, each of the said supports comprising a substantially U-shaped member consisting of a body adapted to rest upon the floor of the car when in operative position, and arms extending upwardly from the ends of the body, a threaded rod supported longitudinally of the body at the upper ends of the arms and detachably connected with the arms, a substantially U-shaped gripping member arranged on each rod, each of the said gripping members being sectional and comprising a hub journaled on the rod, and an arm extending radially from the outer end of the hub, said arms coöperating to grasp opposite faces of the tire, lock nuts on the rod at the outer side of each section, the body having at its outer end a depending lug, and each lug having a pair of inwardly extending bearing arms journaled on the adjacent rod, said arms being spaced apart longitudinally of the rod, an eye-bolt engaging the rod between the arms, the lug having an opening through which the eye-bolt extends, said bolt having a head at the opposite side of the lug from the rod, and a nut threaded on to the rod for clamping the support to the rod.

3. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of the car at the inner side of the adjacent opening, or to a position below the level of the floor, said supports being arranged in pairs and the members of each pair being adapted to engage a wheel in front and in rear thereof, a clamping member mounted on the rod between each pair of supports and arranged to swing through the adjacent openings, the car having means for supporting the supports and the clamping members below the floor.

4. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of a car at the inner side of the adjacent opening, or to a position below the level of the floor, said supports being arranged in pairs and the members of each pair being adapted to engage a wheel in front and in rear thereof, and a clamping member mounted on the rod between each pair of supports and arranged to swing through the adjacent openings.

5. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of the car at the inner side of the adjacent opening, or to a position below the level of the floor, said supports being arranged in pairs and the members of each pair being adapted to engage a wheel in front and in rear thereof.

6. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of wheel supports mounted on each rod, and arranged to be swung through the adjacent opening to a position on the floor of a car at the inner side of the adjacent opening, or to a position below the level of the floor.

7. The combination with a freight car having a longitudinally extending opening through the floor at each side thereof, and the series of doors for closing each opening and hinged to the adjacent side wall of the car, of a shaft or rod extending longitudinally of the car at the inner side of each opening and below the floor, a series of clamping devices mounted on each rod, and arranged to be swung through the adjacent opening to a position on the floor of a car at the inner side of the adjacent opening, or to a position below the level of the floor.

8. A freight car provided with a longitudinally extending opening in the floor thereof and at each side of the car, a shaft or rod extending longitudinally of the car at each opening and below the floor, a series of clamping devices mounted on each rod and arranged to be swung through the adjacent opening to a position on the floor of the car or to a position below the level of the floor.

9. A freight car provided with a longitudinally extending opening in the floor thereof, a rod or shaft supported below the opening, and clamping devices mounted on the shaft or rod for swinging movement into a position on the floor of the car or to a position below the level of the floor.

10. A freight car provided with a longitudinally extending opening in the floor thereof and at each side of the car, a shaft or rod extending longitudinally of the car at each opening and below the floor, a series of clamping devices mounted on each rod and arranged to be swung through the adjacent opening to a position on the floor of the car or to a position below the level of the floor, the said devices being slidable longitudinally of the shaft or rod, and means for fixing each of the said devices with respect to the rod.

EMILE FREDERICK MARTIN.

Witnesses:
H. L. BALLOWE,
J. C. BALLAY.